July 22, 1924.

S. F. WALDEN

TIRE CARRIER

Filed May 9, 1923

1,501,976

Inventor,
Stanley F. Walden;
By A. B. Upham,
Attorney.

Patented July 22, 1924.

1,501,976

UNITED STATES PATENT OFFICE.

STANLEY F. WALDEN, OF WEST NEWTON, MASSACHUSETTS.

TIRE CARRIER.

Application filed May 9, 1923. Serial No. 637,666.

*To all whom it may concern:*

Be it known that I, STANLEY F. WALDEN, a citizen of the United States, and a resident of West Newton, in the county of Middlesex and Commonwealth of Massachusetts, have invented certain new and useful Improvements in Tire Carriers, of which the following is a full, clear, and exact specification.

The object of this invention is the construction of an improved device designed to be permanently attached to trucks for carrying a spare tire.

Figure 1:
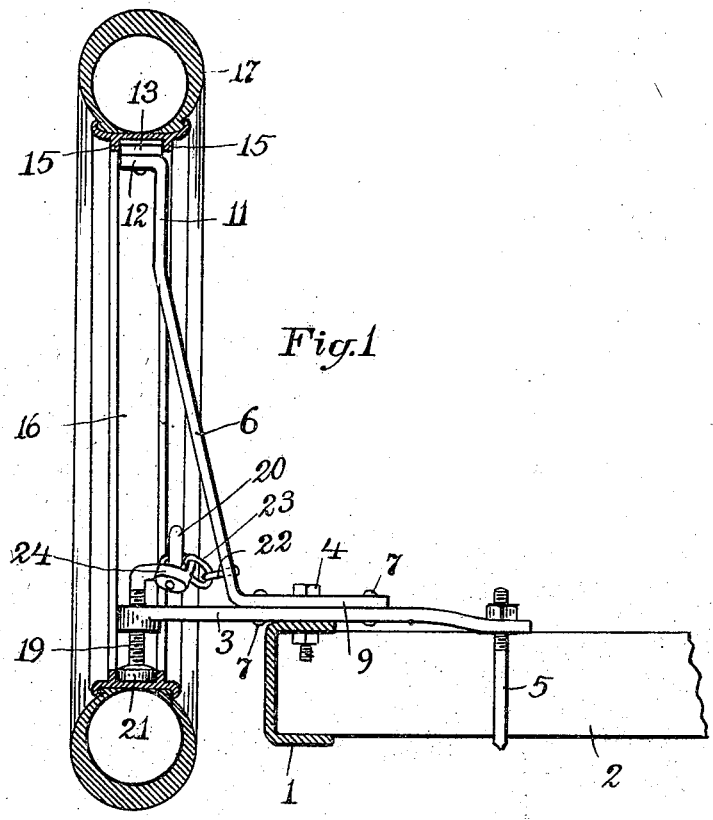
Figure 2:
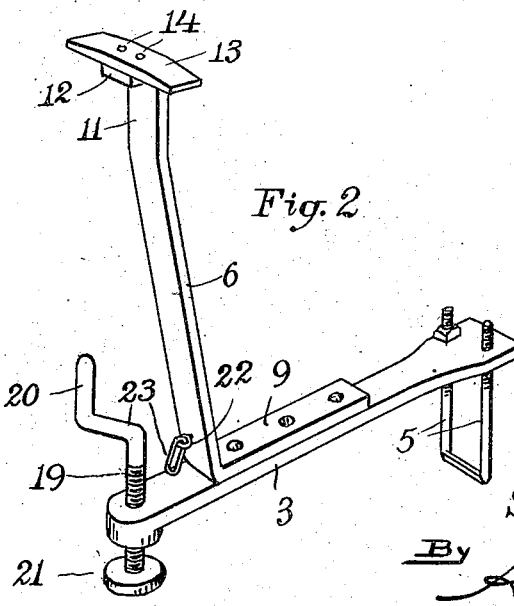

In the drawings forming part of this specification, Fig. 1 is an elevation of a tire carrier embodying my improvements, showing it attached to the truck frame and carrying a spare tire, the frame and tire being in section. Fig. 2 is a perspective view of the tire carrier alone.

In Fig. 1, the reference numeral 1 designates one of the side channel-beams of the truck frame; and 2, one of its cross bars. The main part of the tire carrier comprises a substantially horizontal bar 3 attached to the beam 1 and to the cross bar 2 by a bolt 4 and by a yoke 5; and a standard 6 rigidly fastened to the bar 3, as by rivets 7, the rivets being passed through a foot 9 of the standard, and the bar 3. The larger part of the standard 6 is inclined somewhat in order to present its upper portion in vertical alinement above the outer end of the bar 3, this inclined section merging into a short vertical section 11 whose extremity is bent horizontally to form a short elbow 12.

Upon the upper surface of this elbow is attached a head 13, as by rivets 14, disposed for fitting in between the ribs 15 of a rim 16 of a well known form, the ends of the head being beveled down to partially accord with the concave inner surface of the rim. This rim carries a pneumatic tire 17 ready to be substituted for a deflated tire at a moment's notice.

Down through the projecting end of the bar 3 is tapped a bolt 19 having an operating handle 20 at its upper end and a rotative head 21 at its lower end the diameter of which is slightly less than the distance between the ribs 15.

Attached to the standard 6 by an eye 22 is a link 23, adapted to be shackeled to the handle 20 by a padlock 24, as shown in Fig. 1.

For securing a spare tire and rim to the tire carrier, the link and handle are released from the padlock 24, and the bolt 19 is turned up a short distance. Then the tire is rested upon the head 13, with the latter fitting between the ribs 15 of the rim, and the diametrically opposite section of the rim beneath the head 21. The bolt 19 being turned down until its head 21 pressed against the rim between the ribs, and the padlock 24 made to join the handle 20 and the link 23, the tire is made secure and can neither become accidentally lost or wilfully removed.

The inclination of the standard 6 not only provides room for the handle 20 and the locking means, but by its slight flexible yield permits the handle 20 to be turned to bring it adjacent the link 23 after the head 21 has been screwed down against the rim.

What I claim is:

1. A tire carrier comprising a horizontal member adapted to be attached to the frame of a truck and the like, a member rising from said horizontal member and attached thereto at an intermediate point and inclined to present its upper end in substantially the same vertical line with the outer end of the horizontal member, a head attached to the upper end of the inclined member, and a bolt having a crank arm turning in the outer part of the horizontal member, said head and bolt being disposed for engaging diametrically opposite points of a tire-rim.

2. A tire carrier comprising a horizontal member adapted to be attached to the frame of a truck and the like, an inclined member having a foot attached to said horizontal member, a head attached to the upper end of said inclined member, a bolt turning in the outer part of the horizontal member having a crank handle at its upper end, a link loosely attached to said inclined member, and a padlock adapted to be engaged with both said link and crank handle to lock the bolt from being turned, said bolt and head being adapted to engage the inner periphery of a tire-rim.

3. A tire carrier comprising a horizontal member having its inner end widened in comparison with its main portion, a yoke adapted to engage said widened end and the cross bar of the frame of a truck, a bolt turning in the outer end of said horizontal member and having a head turning on its lower end, an inclined member having a foot attached to said horizontal member and an elbow at its upper end, a head attached to said elbow, and bolt adapted for attaching said foot and horizontal member to the side beam of a truck-frame, said heads being disposed to fit between the two ribs of a well-known form of tire-rim.

In testimony that I claim the foregoing invention, I have hereunto set my hand this 4th day of May, 1923.

STANLEY F. WALDEN.